(12) United States Patent
Durham

(10) Patent No.: US 10,094,460 B1
(45) Date of Patent: Oct. 9, 2018

(54) VIBRATION DAMPER AND LOCK-UP CLUTCH FOR HYDROKINETIC TORQUE-COUPLING DEVICE, AND METHOD FOR MAKING THE SAME

(71) Applicant: VALEO EMBRAYAGES, Amiens (FR)

(72) Inventor: Patrick Durham, Troy, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/480,639

(22) Filed: Apr. 6, 2017

(51) Int. Cl.
| F16H 45/02 | (2006.01) |
| F16H 41/24 | (2006.01) |
| F16F 15/121 | (2006.01) |
| F16D 25/0635 | (2006.01) |
| F16H 41/28 | (2006.01) |

(52) U.S. Cl.
CPC ......... *F16H 45/02* (2013.01); *F16F 15/1215* (2013.01); *F16H 41/24* (2013.01); *F16D 25/0635* (2013.01); *F16D 2300/22* (2013.01); *F16F 2230/0064* (2013.01); *F16F 2232/02* (2013.01); *F16H 41/28* (2013.01); *F16H 2045/0221* (2013.01); *F16H 2045/0294* (2013.01)

(58) Field of Classification Search
CPC .......... F16H 45/02; F16H 41/24; F16H 41/28; F16H 2045/0221; F16H 2045/0294; F16F 15/1215; F16F 2230/0064; F16F 2232/02; F16D 25/0635; F16D 2300/22
See application file for complete search history.

(56) References Cited

U.S. PATENT DOCUMENTS

| 2,551,718 | A | | 5/1951 | Auten |
| 4,145,936 | A | | 3/1979 | Vincent et al. |
| 5,697,261 | A | | 12/1997 | Mokdad et al. |
| 5,893,355 | A | | 4/1999 | Glover et al. |
| 9,822,862 | B2 | * | 11/2017 | Depraete ................. F16H 45/02 |
| 9,850,995 | B2 | * | 12/2017 | Depraete ................. F16H 45/02 |

(Continued)

FOREIGN PATENT DOCUMENTS

| DE | 19729421 A1 | 1/1998 |
| DE | 19919449 A1 | 11/1999 |

(Continued)

*Primary Examiner* — Jacob S. Scott
*Assistant Examiner* — Tinh Dang
(74) *Attorney, Agent, or Firm* — Berenato & White, LLC

(57) ABSTRACT

A torque-coupling device for coupling driving and driven shafts. The torque-coupling device includes a casing having a locking surface, a torque converter, and a locking piston having an engagement surface axially moveable to and from the locking surface of the casing. The locking piston includes a vibration damper including a torque input member and a unitary radially elastic output member elastically coupled to the torque input member. The torque input member includes a radially oriented first retainer plate and at least one supporting member mounted thereto. The output member includes an output hub and at least one elastic blade configured to elastically engage the supporting member upon rotation of the first retainer plate with respect to the output member. The torque input member of the vibration damper non-rotatably engages the turbine wheel and is axially moveable relative to both the impeller wheel and turbine wheel.

20 Claims, 10 Drawing Sheets

(56) References Cited

U.S. PATENT DOCUMENTS

| | | | |
|---|---|---|---|
| 9,989,135 B2 * | 6/2018 | Depraete | F16H 45/02 |
| 2003/0106763 A1 | 6/2003 | Kimura et al. | |
| 2015/0369296 A1 | 12/2015 | Lopez-Perez | |
| 2017/0097079 A1 * | 4/2017 | Depraete | F16H 45/02 |
| 2017/0097080 A1 * | 4/2017 | Depraete | F16H 45/02 |
| 2017/0234399 A1 * | 8/2017 | Durham | F16H 45/02 192/3.28 |
| 2017/0363193 A1 * | 12/2017 | Jeon | F16H 45/02 |
| 2017/0363194 A1 * | 12/2017 | Durham | F16H 45/02 |
| 2017/0363195 A1 * | 12/2017 | Durham | F16F 15/1333 |
| 2018/0003262 A1 * | 1/2018 | Samie | F16F 15/1213 |
| 2018/0058561 A1 * | 3/2018 | Durham | F16H 45/02 |
| 2018/0142769 A1 * | 5/2018 | Depraete | F16H 45/02 |

FOREIGN PATENT DOCUMENTS

| | | |
|---|---|---|
| DE | 102004024747 A1 | 12/2005 |
| EP | 1048420 A2 | 11/2000 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2714435 A1 | 6/1995 |
| FR | 2828543 A1 | 2/2003 |
| FR | 2938030 A1 | 5/2010 |
| FR | 3000155 A1 | 6/2014 |
| FR | 3008152 A1 | 1/2015 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| WO | WO9914114 A1 | 3/1999 |
| WO | WO2004016968 A1 | 2/2004 |
| WO | WO2011006264 A1 | 1/2011 |
| WO | WO2014128380 A1 | 8/2014 |

* cited by examiner

VIBRATION DAMPER AND LOCK-UP CLUTCH FOR HYDROKINETIC TORQUE-COUPLING DEVICE, AND METHOD FOR MAKING THE SAME

BACKGROUND OF THE INVENTION

1. Field of the Invention

The present invention generally relates to fluid coupling devices, and more particularly to a vibration damper for hydrokinetic torque-coupling devices, and a method for making the same.

2. Background of the Invention

A conventional hydrokinetic torque-coupling device 1 is schematically and partially illustrated in FIG. 1 and is configured to transmit torque from an output shaft of an internal combustion engine in a motor vehicle, such as for instance crankshaft 2a, to a transmission input shaft 2b. The conventional hydrokinetic torque-coupling device comprises a hydrokinetic torque converter 4 and a torsional vibration damper 5. The hydrokinetic torque converter conventionally comprises an impeller wheel 4i, a turbine wheel 4t, a stator (or reactor) 4s fixed to a casing of the torque converter 4, and a one-way clutch for restricting rotational direction of the stator 8 to one direction. The impeller wheel 4i is configured to hydrokinetically drive the turbine wheel 4t through the reactor 4s. The impeller wheel 4i is coupled to the crankshaft 1 and the turbine wheel 4t is coupled to a guide washer 6.

The torsional vibration damper 5 of the compression spring-type comprises a first group of coil springs 7a, 7b mounted between the guide washer 6 and an output hub 8 coupled to the transmission input shaft 2b. The coil springs 7a, 7b of the first group are arranged in series through a phasing member 9, so that the coil springs 7a, 7b are deformed in phase with each other, with the phasing member 9 being movable relative to the guiding washer 6 and relative to the output hub 8. A second group of coil springs 7c is mounted with some clearance between the guide washer 6 and the output hub 8 in parallel with the first group of elastic members 7a, 7b, with the coil springs 7c configured to be active in a limited angular range, more particularly at the end of the angular travel of the guide washer 6 relative to the output hub 8. The angular travel, or the angular shift α, of the guide washer 6 relative to the output hub 8, is defined relative to a rest position (α=0) wherein no torque is transmitted through damping means formed by the coil springs 7a, 7b. The second group of coil springs 7c makes it possible to increase the stiffness of the damping assembly at the end of angular travel, i.e. for a significant a angular offset of the guide washer 6 relative to the output hub 8 (or vice versa).

The torque-coupling device 1 further comprises a lock-up clutch 3 adapted to transmit torque from the crankshaft 2a to the guide washer 6 in a determined operation phase, without action from the impeller wheel 4i and the turbine wheel 4t.

The turbine wheel 4t is integrally or operatively connected with the output hub 8 linked in rotation to a driven shaft, which is itself linked to an input shaft of a transmission of a vehicle. The casing of the torque converter 4 generally includes a front cover and an impeller shell which together define a fluid filled chamber. Impeller blades are fixed to an impeller shell within the fluid filled chamber to define the impeller assembly. The turbine wheel 4t and the stator 4s are also disposed within the chamber, with both the turbine wheel 4t and the stator 4s being relatively rotatable with respect to the front cover and the impeller wheel 4i. The turbine wheel 4t includes a turbine shell with a plurality of turbine blades fixed to one side of the turbine shell facing the impeller blades of the impeller wheel 4i.

The turbine wheel 4t works together with the impeller wheel 4i, which is linked in rotation to the casing that is linked in rotation to a driving shaft driven by an internal combustion engine. The stator 4s is interposed axially between the turbine wheel 4t and the impeller wheel 4i, and is mounted so as to rotate on the driven shaft with the interposition of the one-way clutch.

While conventional hydrokinetic torque-coupling devices, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque-coupling device for coupling a driving shaft and a driven shaft together. The torque-coupling device comprises a casing rotatable about a rotational axis and having a locking surface, a torque converter including an impeller wheel rotatable about the rotational axis and a turbine wheel disposed in the casing coaxially with the rotational axis, and a locking piston axially moveable along the rotational axis to and from the locking surface of the casing. The turbine wheel is disposed axially opposite to the impeller wheel and hydro-dynamically rotationally drivable by the impeller wheel. The locking piston has an engagement surface configured to selectively frictionally engage the locking surface of the casing to position the hydrokinetic torque-coupling device into and out of lockup mode, in which the locking piston is mechanically frictionally locked to the casing so as to be non-rotatable relative to the casing. The locking piston includes a vibration damper comprising a torque input member and a unitary radially elastic output member pivotable relative to and elastically coupled to the torque input member. The torque input member includes a radially oriented first side plate and at least one supporting member mounted thereto. The radially elastic output member includes an annular output hub coaxial with the rotational axis and rotatable relative the torque input member, and at least one elastic blade integral with the output hub and configured to elastically and radially engage the at least one supporting member and to elastically bend in the radial direction upon rotation of the first side plate with respect to the radially elastic output member. The at least one elastic blade has a proximal end non-moveably connected to the output hub, a free distal end and a curved raceway portion disposed between the proximal and free distal ends of the at least one elastic blade for bearing the at least one supporting member. The annular output hub of the radially elastic output member is adapted to directly and non-rotatably engage the driven shaft. The first side plate of the torque input member of the vibration damper non-rotatably engages the turbine wheel. The torque input member is axially moveable relative to both the impeller wheel and turbine wheel to and from the locking surface of the casing.

According to a second aspect of the present invention, there is provided a method for assembling a hydrokinetic torque-coupling device for coupling together a driving shaft and a driven shaft. The method involves the steps of providing a casing having a locking surface, providing a torque converter comprising an impeller wheel and a turbine wheel, and providing a locking piston having an engagement surface configured to selectively frictionally engage the locking surface of the casing to position the hydrokinetic torque-coupling device into and out of lockup mode in which the locking piston is mechanically frictionally locked to the casing so as to be non-rotatable relative to the casing. The locking piston includes a vibration damper comprising a torque input member and a unitary radially elastic output member rotatable relative to and elastically coupled to the torque input member. The torque input member includes a radially oriented first retainer plate and at least one supporting member mounted thereto. The radially elastic output member includes an annular output hub coaxial with the rotational axis and rotatable relative the torque input member, and at least one elastic blade integral with the output hub and configured to elastically and radially engage the at least one supporting member and to elastically bend in the radial direction upon rotation of the first retainer plate with respect to the radially elastic output member. The at least one elastic blade has a proximal end non-moveably connected to the output hub, a free distal end and a curved raceway portion disposed between the proximal and free distal ends of the at least one elastic blade for bearing the at least one supporting member. The annular output hub of the radially elastic output member is adapted for directly and non-rotatably engaging the driven shaft. The method further involves the steps of non-rotatably connecting the first side plate of the vibration damper to the turbine wheel so that the engagement surface of the locking piston facing the locking surface of the casing.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
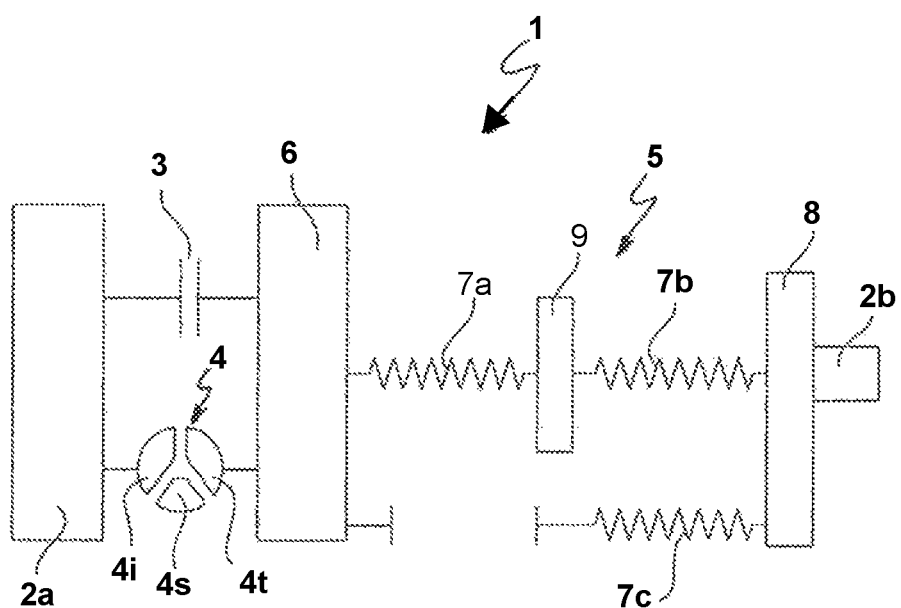
FIG. 1 is a schematic representation of a torque-coupling device of the prior art.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 2:
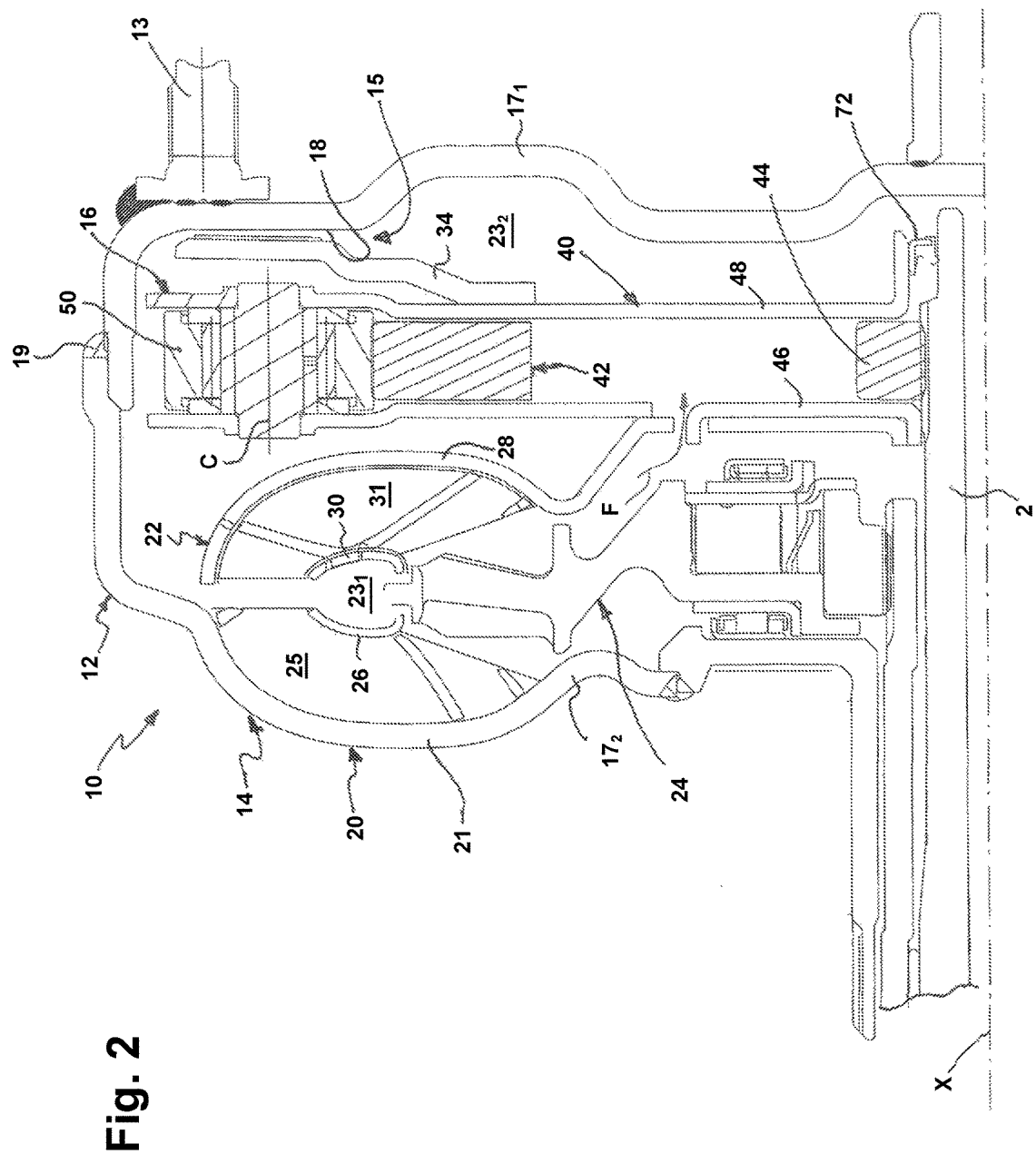
FIG. 2 is a fragmented half-view in axial section of a hydrokinetic torque-coupling device with a torsional vibration damper in accordance with an exemplary embodiment of the present invention.

A first exemplary embodiment of a hydrokinetic torque-coupling device is generally represented in FIG. 2 by reference numeral 10. The hydrokinetic torque-coupling device 10 is intended to couple a driving shaft and a driven shaft 2, for example of a motor vehicle. In this case, the driving shaft is an output shaft of an internal combustion engine (ICE) of the motor vehicle and the driven shaft 2 is a transmission input shaft of an automatic transmission of the motor vehicle.

The hydrokinetic torque-coupling device 10 comprises a sealed casing 12 filled with a fluid, such as oil or transmission fluid, and rotatable about a rotational axis X of rotation, a hydrokinetic torque converter 14 disposed in the casing 12, a lock-up clutch 15 and a torque-transmitting device (or torsional vibration damper) 16 also disposed in the casing 12. The torsional vibration damper 16 of the present invention is in the form of a leaf (or blade) damper. The sealed casing 12, the torque converter 14, the lock-up clutch 15 and the torsional vibration damper 16 are all rotatable about the rotational axis X. The drawings discussed herein show half-views, that is, a cross-section of the portion or fragment of the hydrokinetic torque-coupling device 10 above the rotational axis X. As is known in the art, the torque-coupling device 10 is symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 2 includes a first shell (or casing shell) $17_1$, and a second shell (or impeller shell) $17_2$ disposed coaxially with and axially opposite to the first shell $17_1$. The first and second shells $17_1$, $17_2$ are non-movably (i.e., fixedly) interconnected and sealed together about their outer peripheries, such as by weld 19. The first shell $17_1$ is non-movably (i.e., fixedly) connected to the driving shaft, more typically to the output shaft of the ICE through a flexplate that is non-rotatably fixed to the driving shaft, so that the casing 12 turns at the same speed at which the engine operates for transmitting torque. Specifically, in the illustrated embodiment of FIG. 2, the casing 12 is rotatably driven by the ICE and is non-rotatably coupled to the driving shaft thereof, such as with studs 13 through the flexplate. Typically, the studs 13 are fixedly secured, such as by welding, to the first shell $17_1$. Each of the first and second shells $17_1$, $17_2$ are integral or one-piece and may be made, for example, by press-forming one-piece metal sheets.

The torque converter 14 comprises an impeller wheel (sometimes referred to as the pump, impeller assembly or impeller) 20, a turbine wheel (sometimes referred to as the turbine assembly or turbine) 22, and a stator (sometimes referred to as the reactor) 24 interposed axially between the impeller wheel 20 and the turbine wheel 22. The impeller wheel 20, the turbine wheel 22, and the stator 24 are coaxially aligned with one another and the rotational axis X. The impeller wheel 20, the turbine wheel 22, and the stator 24 collectively form a torus. The impeller wheel 20 and the turbine wheel 22 may be fluidly coupled to one another in operation as known in the art. In other words, the turbine wheel 22 is hydro-dynamically drivable by the turbine wheel 22.

The impeller wheel 20 includes a substantially annular, semi-toroidal (or concave) impeller shell 21, a substantially annular impeller core ring 26, and a plurality of impeller blades 25 fixedly (i.e., non-moveably) attached, such as by brazing, to the impeller shell 21 and the impeller core ring 26. Thus, at least a portion of the second shell $17_2$ of the casing 12 also forms and serves as the impeller shell 21 of the impeller wheel 20. Accordingly, the impeller shell 21 sometimes is referred to as part of the casing 12. The impeller wheel 20, including the impeller shell 21 (the part of the casing 12), the impeller core ring 26 and the impeller blades 25, are non-rotatably secured to the driving shaft (or flywheel) of the engine to rotate at the same speed as the engine output. The impeller shell 21, impeller core ring 26 and the impeller blades 25 are conventionally formed by stamping from steel blanks.

Figure 3:
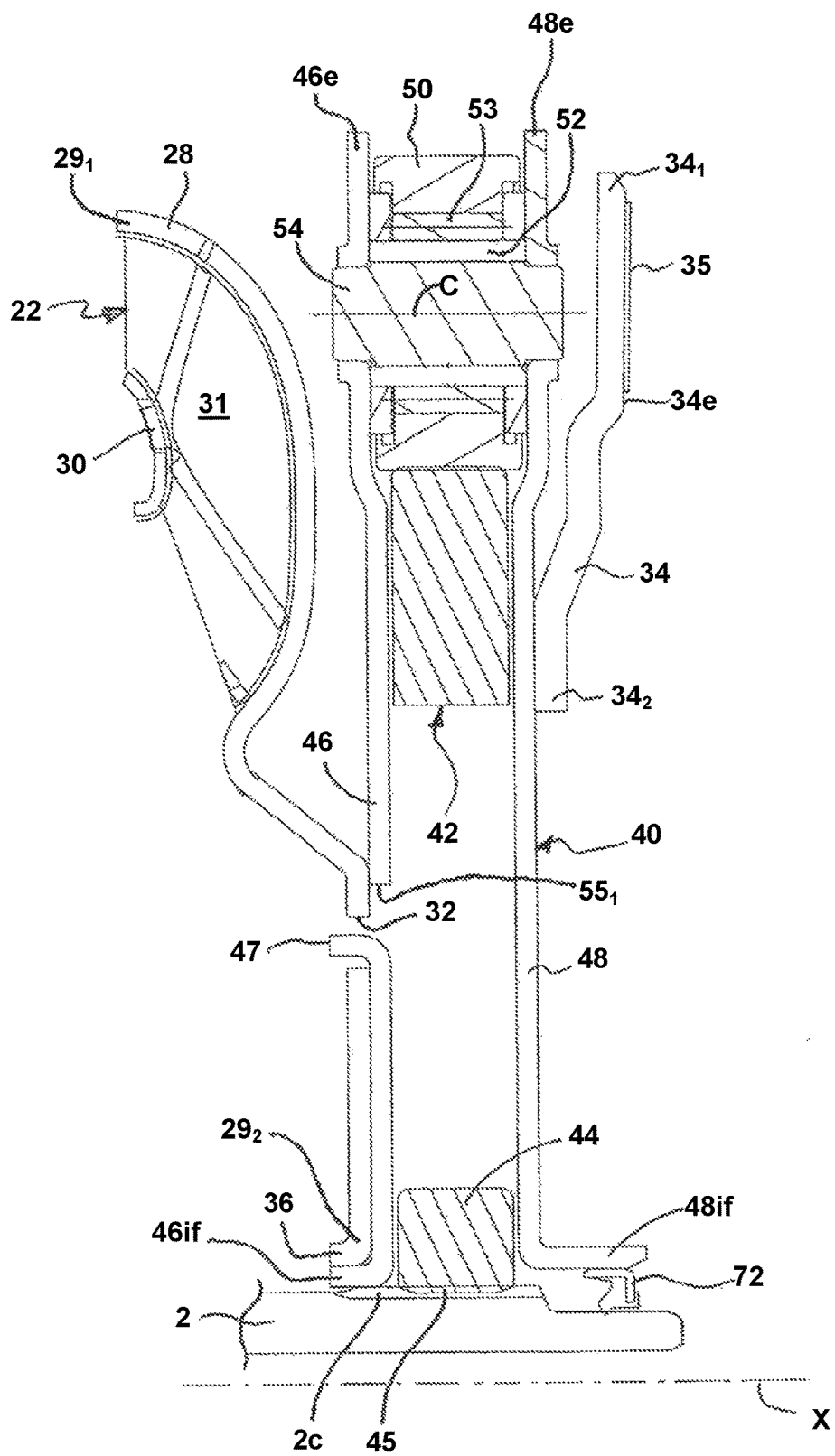
FIG. 3 is fragmented partial half-view in axial section of the hydrokinetic torque-coupling device of FIG. 2 showing the torsional vibration damper and a locking piston in accordance with the exemplary embodiment of the present invention.
Figure 7:
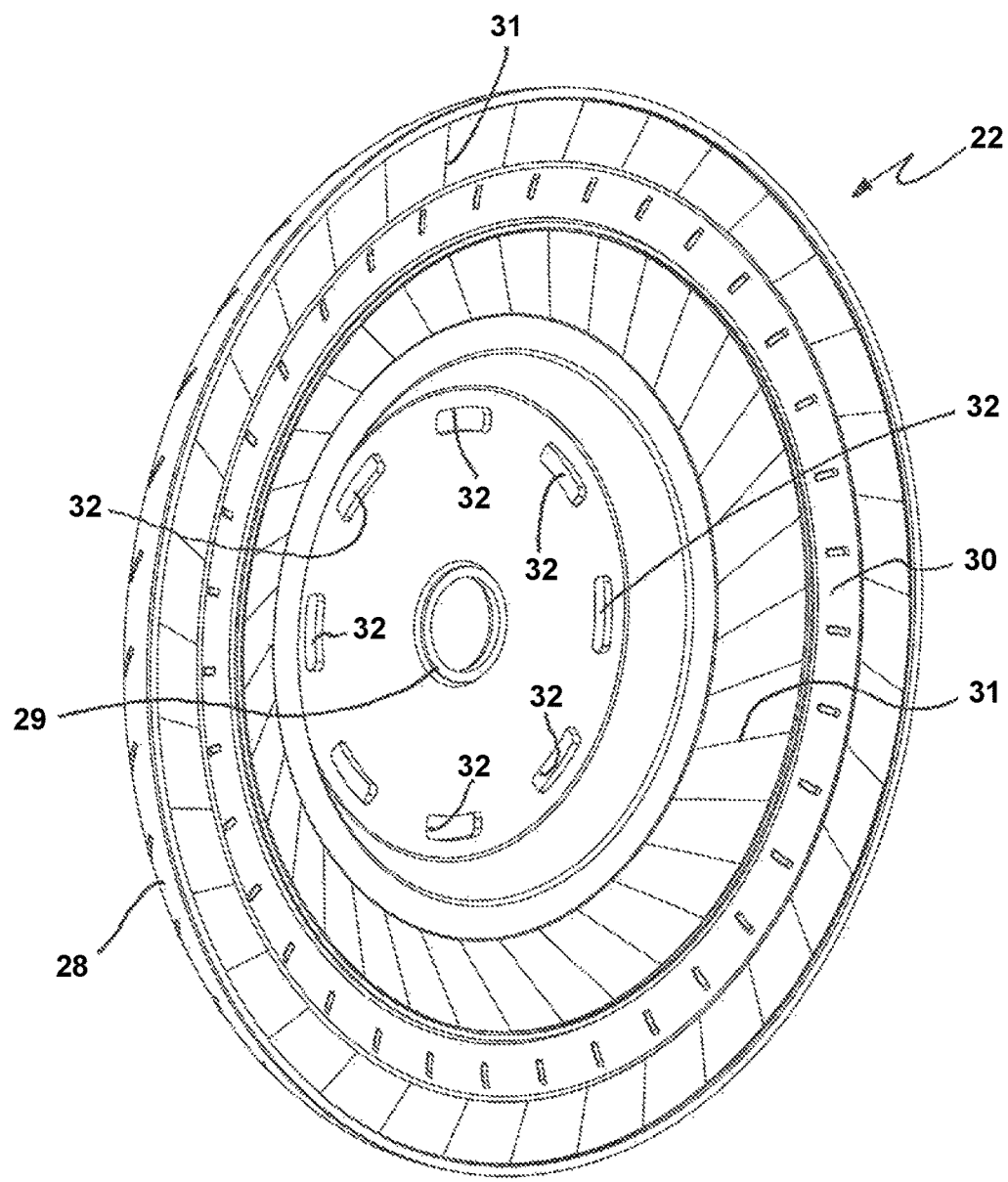
FIG. 7 is a perspective view of a turbine shell in accordance with the exemplary embodiment of the present invention.

The turbine wheel 22, as best shown in FIG. 2, comprises a substantially annular, semi-toroidal (or concave) turbine shell 28 rotatable about the rotational axis X, a substantially annular turbine core ring 30, and a plurality of turbine blades 31 fixedly (i.e., non-moveably) attached, such as by brazing, to the turbine shell 28 and the turbine core ring 30. The turbine shell 28 of the turbine wheel 22 is formed with at least one, and preferably a plurality of coupling openings 32 therethrough and circumferentially and equiangularly spaced from each other around the rotational axis X, as best shown in FIGS. 3 and 7. The turbine shell 28, the turbine core ring 30 and the turbine blades 31 are conventionally formed by stamping from steel blanks. Extending axially outwardly at a radially inner peripheral end $29_1$ of the turbine shell 28 is a generally cylindrical, radially inner flange 36. The cylindrical flange 36 of the turbine wheel 22 is rotatable relative to the driven shaft 2.

The impeller shell 21 and the turbine-piston shell 28 collectively define a substantially toroidal first chamber (or torus chamber) $23_1$ therebetween. Referring to FIG. 2, the torus chamber $23_1$ is to the left side of the turbine-piston shell 28, and a second (or damper) chamber $23_2$ is to the other (right) side of the turbine-piston shell 28. In other words, the first chamber $23_1$ is defined between the impeller shell 21 and the turbine-piston shell 28, while the second chamber $23_2$ is defined between torsional vibration damper 16 and the first casing shell $17_1$.

The lock-up clutch 15 includes a locking piston axially moveable along the rotational axis X to and from the locking surface 18 so as to selectively non-rotatably engage the turbine wheel 22 and the casing 12. In turn, the locking piston includes the torsional vibration damper 16 and a substantially annular piston member 34 non-moveably attached (i.e., fixed) to the torsional vibration damper 16. Thus, the torsional vibration damper 16 together with the piston member 34 define the locking piston of the lock-up clutch 15.

The piston member 34 has an engagement surface 34e facing a locking surface 18 defined on the first shell $17_1$ of the casing 12. The piston member 34 is axially moveable along the rotational axis X to and from the locking surface 18 so as to selectively engage the locking surface 18 of the casing 12. The lock-up clutch 15 further includes an annular friction liner 35 fixedly attached to the engagement surface 34e of the piston member 34 by appropriate means known in the art, such as by adhesive bonding. As best shown in FIGS. 2 and 3, the friction liner 35 is fixedly attached to the engagement surface 34e of the piston member 34 at a radially outer peripheral end $34_1$ thereof.

The annular friction liner 35 is made of a friction material for improved frictional performance. Alternatively, an annular friction liner may be secured to the locking surface 18 of the casing 12. According to still another embodiment, a first friction ring or liner is secured to the locking surface 18 of the casing 12 and a second friction ring or liner is secured to the engagement surface 34e of the piston member 34. It is within the scope of the invention to omit one or both of the friction rings. In other words, the annular friction liner 35 may be secured to any, all, or none of the engagement surfaces. Further according to the exemplary embodiment, the engagement surface 34e of the piston member 34 is slightly conical to improve the engagement with the lock-up clutch 15. Specifically, the engagement surface 34e of the piston member 34 holding the annular friction liner 35 is conical, at an angle of between 10° and 30° relative to the engagement surface 34e of the piston member 34 (or to the plane orthogonal to the rotational axis X), to improve the torque capacity of the lock-up clutch 15. Alternatively, the engagement surface 34e of the piston member 34 may be parallel to the locking surface 18 of the casing 12.

The torsional vibration damper 16, as best shown in FIG. 4, advantageously allows the turbine wheel 22 of the torque converter 14 to be coupled, with torque damping, to the driven shaft 2, i.e., the input shaft of the automatic transmission. The torsional vibration damper 16 also allows damping of stresses between the driving shaft and the driven shaft 2 that are coaxial with the rotational axis X, with torsion damping.

The torque-transmitting device 16, as best shown in FIG. 2, is disposed axially between the turbine shell 28 of the turbine assembly 22, and the casing shell $17_1$ of the casing 12. The piston member 34 of the lock-up clutch 15 is non-movably (i.e., fixedly) secured to the torsional vibration damper 16. Moreover, the piston member 34 and the torsional vibration damper 16 are non-rotatably and axially slidably mounted to the driven shaft 2. The torsional vibration damper 16 with the piston member 34 is positioned on the driven shaft 2 in a limited, movable and centered manner. The piston member 34 forms an input part of the torsional vibration damper 16.

Figure 5:
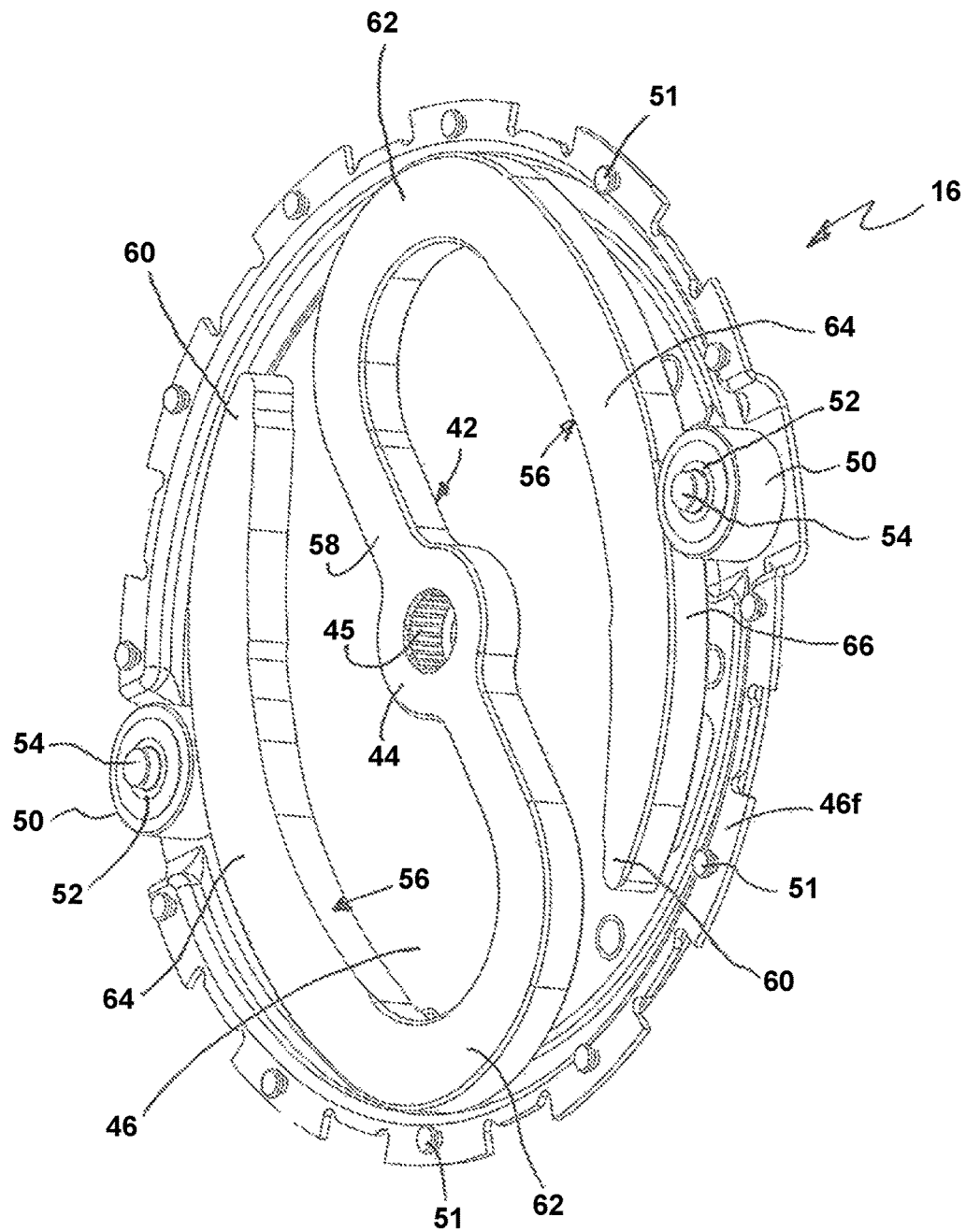
FIG. 5 is a partial perspective view of the torque input member and a radially elastic output member of the torsional vibration damper in accordance with the exemplary embodiment of the present invention.

The torsional vibration damper 16 comprises a torque input member 40 rotatable about the rotational axis X, and an integral radially elastic output member 42 elastically coupled to and configured to pivot (i.e., rotate) relative to the torque input member 40 around the rotational axis X, as best shown in FIGS. 3 and 5.

The torque input member 40 includes two axially opposite annular, radially oriented retainer plates, including a first annular, radially oriented side plate 46 adjacent to the turbine shell 28, and a second annular, radially oriented side plate 48 adjacent to the piston member 34 and the casing shell $17_1$. The first side plate 46 is substantially parallel to and axially spaced from the second side plate 48, as best shown in FIG. 3. Moreover, the first and second side plates 46 and 48, respectively, are non-moveably attached (i.e., fixed) to one another, such as by mechanical fasteners (such as rivets) 51, as best shown in FIGS. 4 and 5.

According to the exemplary embodiment of the present invention, as best illustrated in FIGS. 2-9, a radially distal end 46e of the first side plate 46 has a substantially annular outer (or external) flange 46ef provided with a plurality of circumferentially spaced holes. A radially distal end 48e of the second side plate 48, on the other hand, has a substantially annular outer (or external) flange 48ef provided with a plurality of circumferentially spaced holes. The first and second side plates 46 and 48 are non-movably (i.e., fixedly) secured to one another so that the outer mounting flanges 46ef, 48ef of the first and second side plates 46, 48 axially engage one another and are fixed by the rivets 51 extending through the holes in the outer mounting flanges 46ef, 48ef of the first and second damper side plates 46, 48, as best shown in FIGS. 4 and 5. Thus, the first and second side plates 46, 48 are non-rotatable relative to one another, but rotatable relative to the radially elastic output member 42.

Figure 4A:
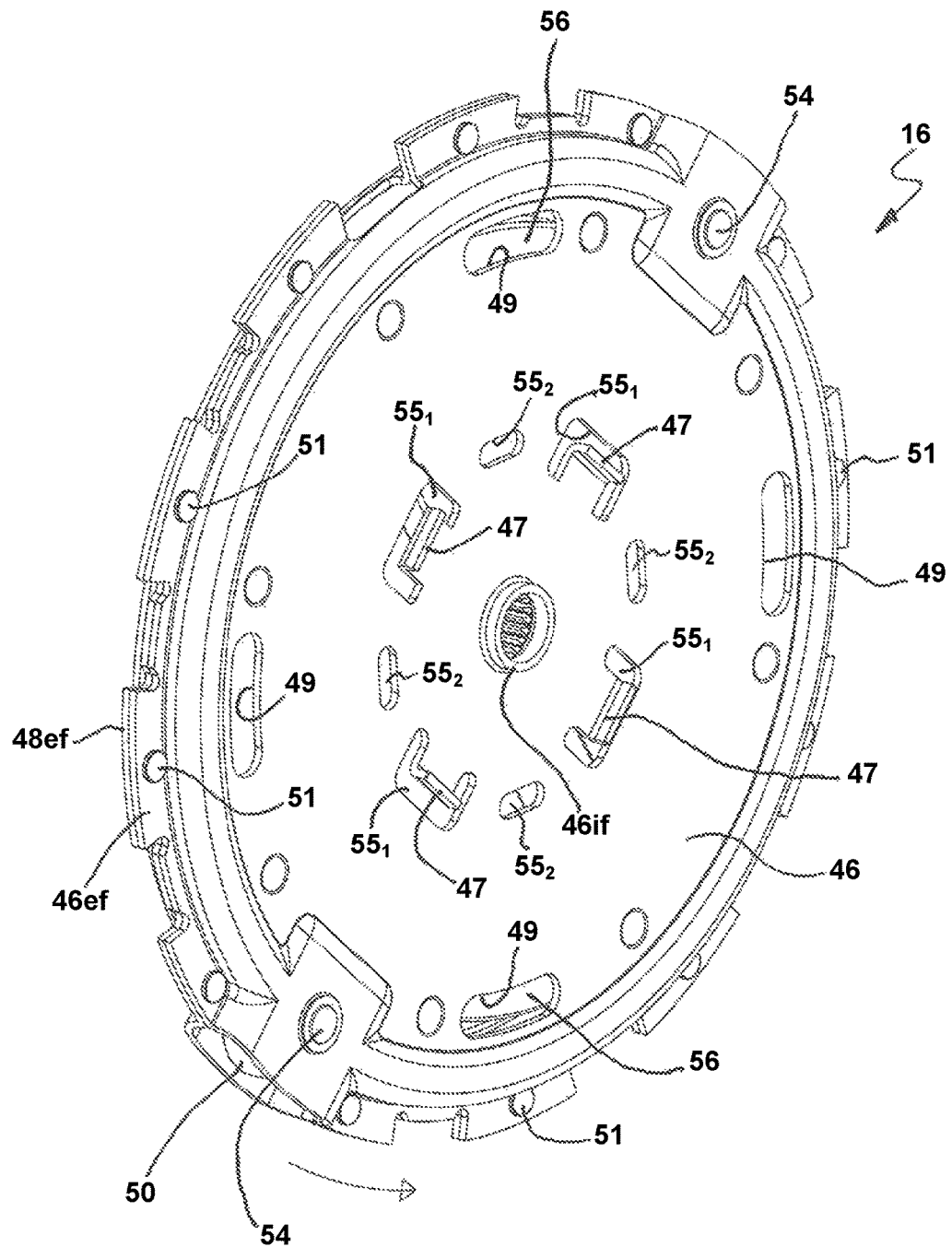
FIG. 4A is a perspective view of a torque input member of the torsional vibration damper in accordance with the exemplary embodiment of the present invention from one side.

Extending axially outwardly at a radially inner peripheral end of the first side plate 46 is a substantially cylindrical, radially inner flange 46if, as best shown in FIG. 4A. The first side plate 46 with the cylindrical flange 46if is rotatable relative to the driven shaft 2. The cylindrical flange 36 of the turbine wheel 22 is mounted onto the cylindrical flange 46if of the first side plate 46 of the torque input member 40 of the torsional vibration damper 16, as best shown in FIG. 3. As discussed in further detail below, the first side plate 46 of the torque input member 40 of the torsional vibration damper 16 is axially movable relative to the turbine wheel 22 and the driven shaft 2 along this interface. The turbine wheel 22 is not axially movable relative to the driven shaft 2 along the rotational axis X.

Figure 4B:
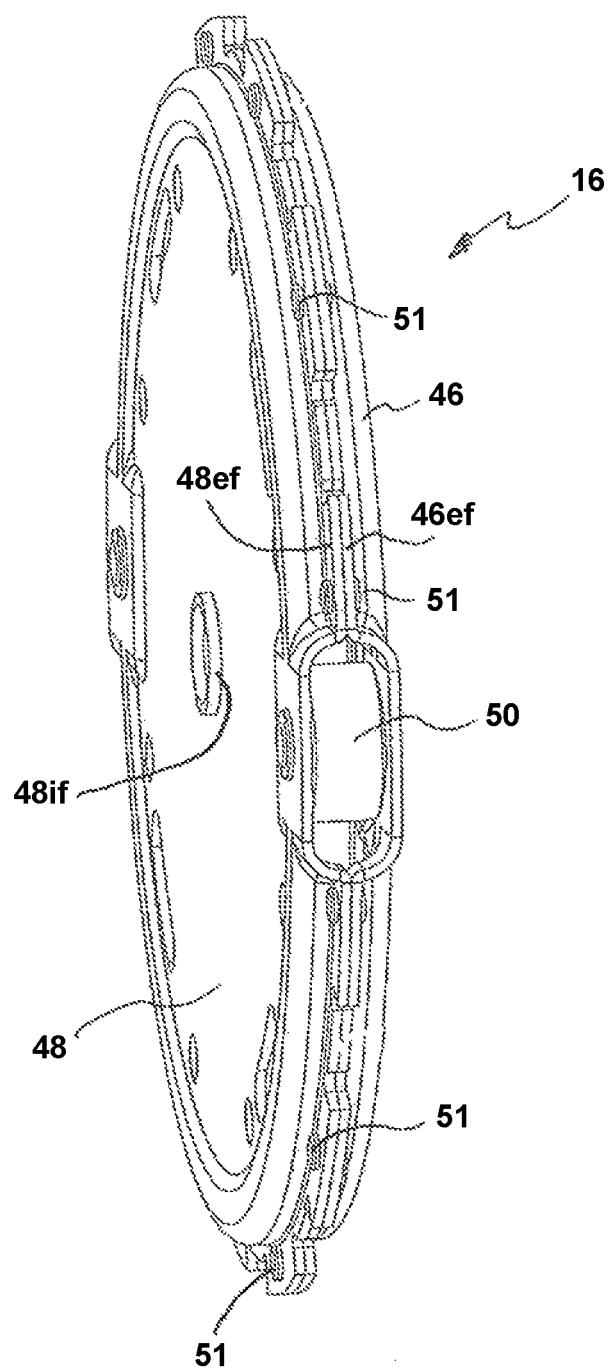
FIG. 4B is a perspective view of the torque input member of the torsional vibration damper in accordance with the exemplary embodiment of the present invention from another side.

Extending axially outwardly at a radially inner peripheral end of the second side plate 48 is a generally cylindrical, radially inner flange 48if, as best shown in FIG. 4B. The second side plate 48 with the cylindrical flange 48if is rotatable relative to the driven shaft 2. A sealing member 72, mounted to the cylindrical flange 48if of the second side plate 48 of the torque input member 40, creates a seal at the interface of the second side plate 48 and the driven shaft 2, as best shown in FIG. 3. As discussed in further detail below, the torque input member 40 of the torsional vibration damper 16 is axially movably relative to the driven shaft 2 along this interface.

As further illustrated in FIGS. 2 and 3, the piston member 34 is non-moveably attached (i.e., fixed) to the second side plate 48 of the torque input member 40 of the torsional vibration damper 16, such as by weld or by fasteners, e.g., rivets. The first and second side plates 46, 48 are arranged axially on either side of the elastic output member 42 and are operatively connected therewith. The first and second side plates 46, 48 are non-movably (i.e., fixedly) secured to one another by any appropriate means, such as by the rivets 51 so as to rotatable relative to the elastic output member 42.

Figure 6:
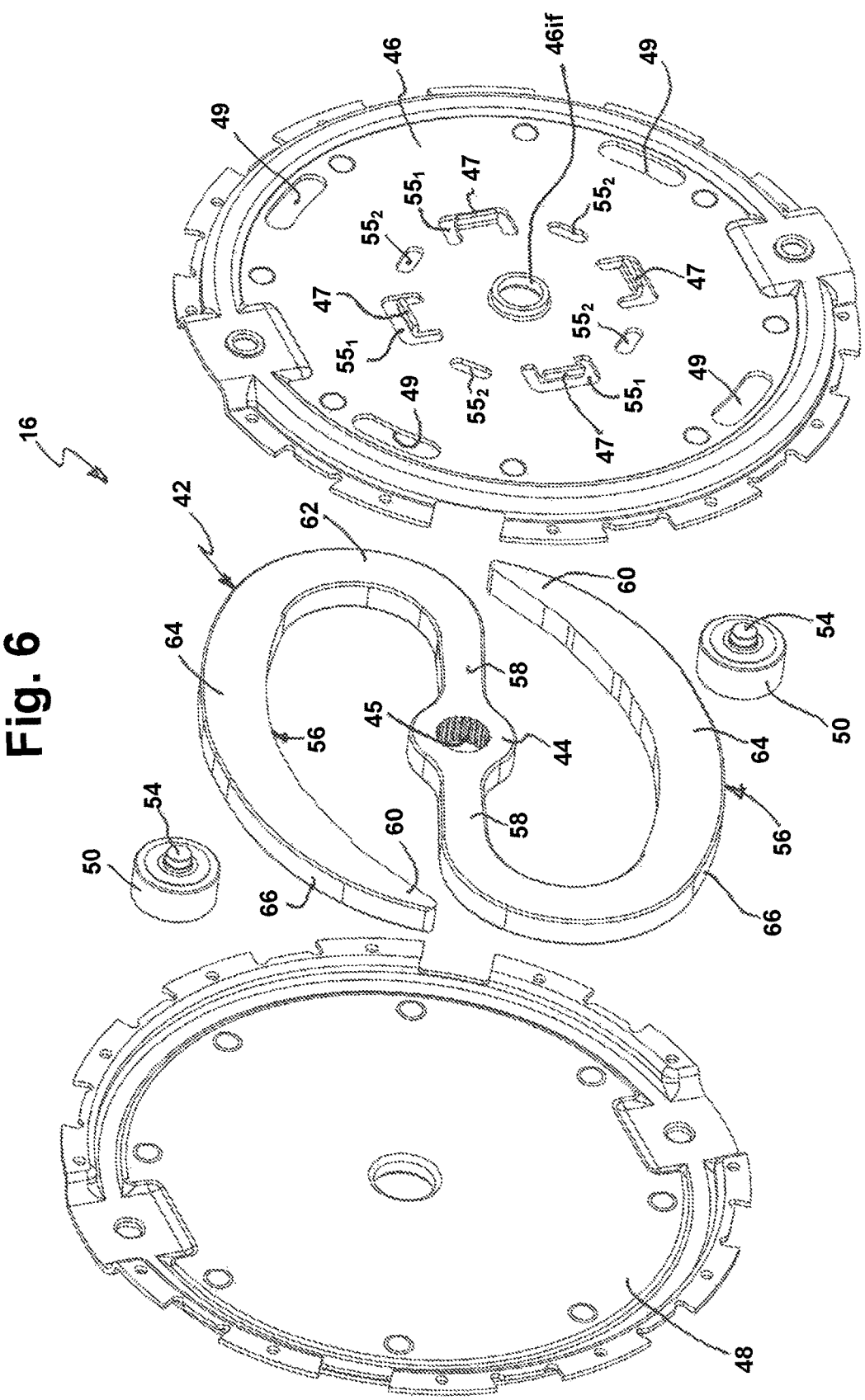
FIG. 6 is an exploded assembly view in perspective of the torsional vibration damper in accordance with the exemplary embodiment of the present invention.
Figure 8:
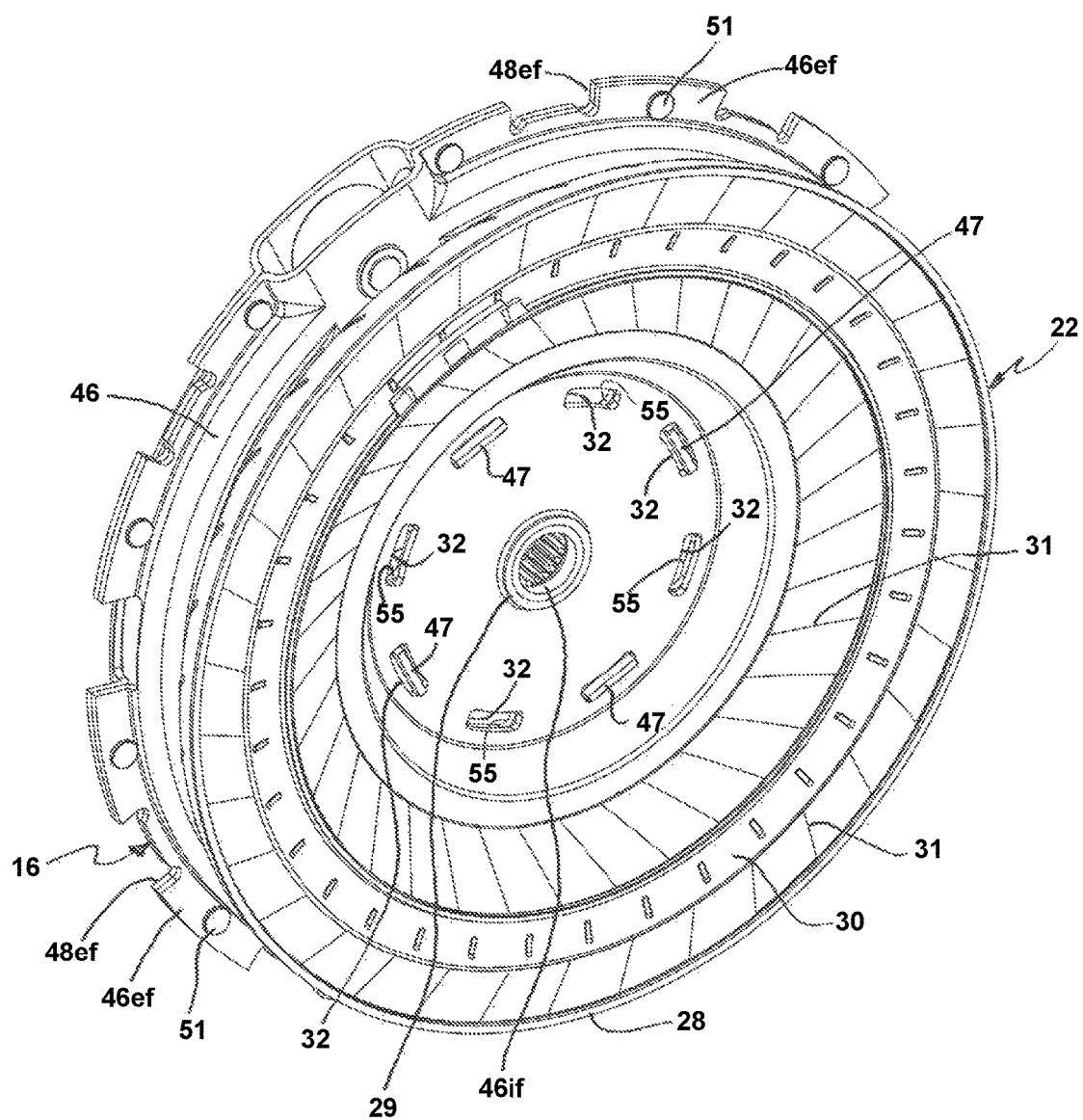
FIG. 8 is a perspective view of the torsional vibration damper and the turbine shell drivingly engaged by the torsional vibration damper in accordance with the exemplary embodiment of the present invention.
Figure 9:
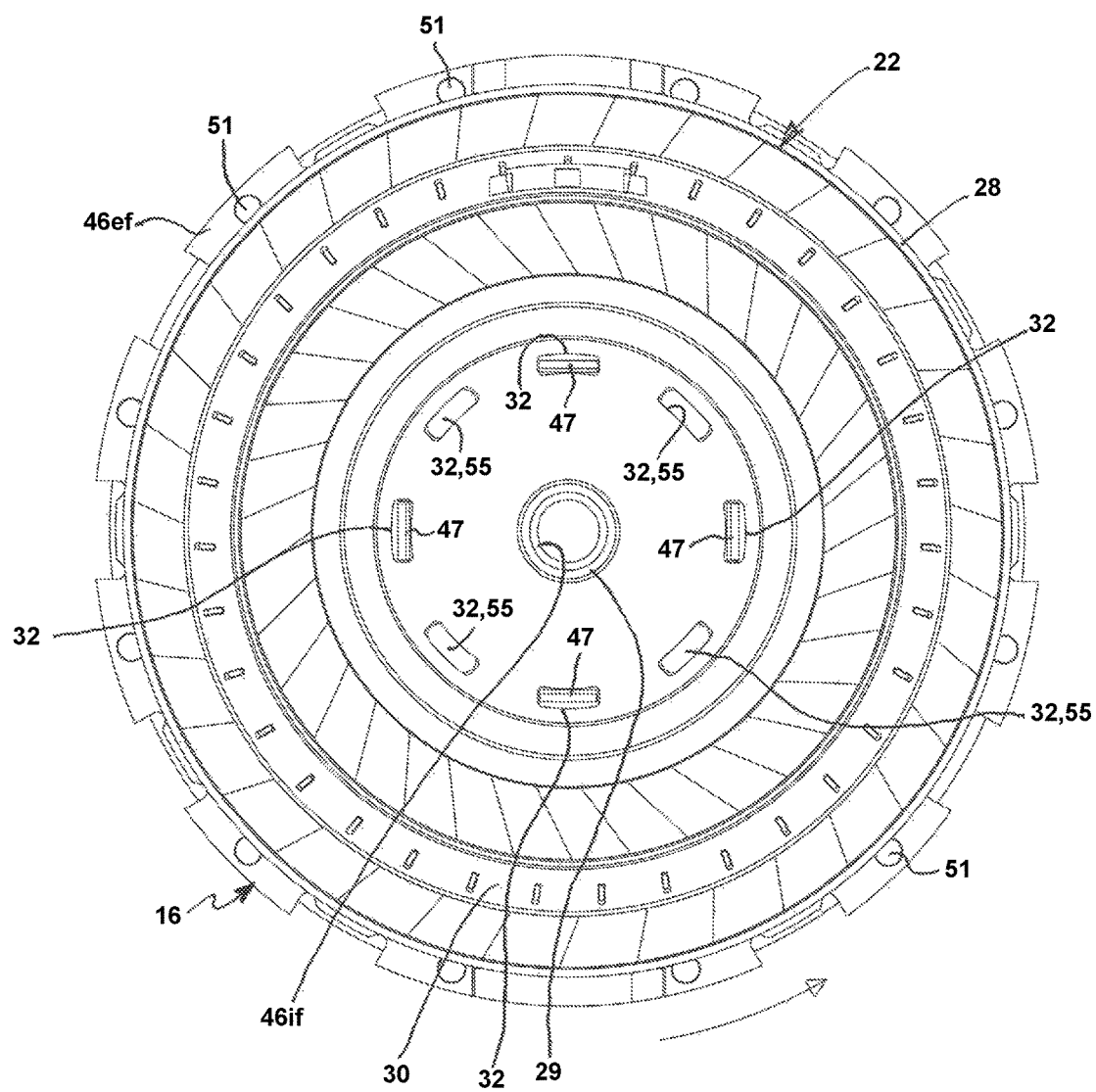
FIG. 9 is a front view of the turbine shell drivingly engaged by the torsional vibration damper in accordance with the exemplary embodiment of the present invention.

Moreover, as best shown in FIGS. 3, 4A and 6, the radially oriented first side plate 46 includes at least one, preferably a plurality of coupling arms 47 axially extending therefrom toward the turbine shell 28 of the turbine wheel 22 and defining a corresponding plurality of first communication openings $55_1$ each adjacent to one of the coupling arms 47. The coupling arms 47 and the first communication openings $55_1$ are circumferentially and equiangularly spaced from each other around the rotational axis X. The first side plate 46 with the axially extending coupling arms 47 is an integral part, e.g., made of a single or unitary (i.e., made as a single part) component, but may be made of separate components fixedly connected together. Each of the coupling arms 47 and each of the first communication openings $55_1$ of the first side plate 46 are complementary to and registered (i.e., radially and angularly aligned) with one of the coupling openings 32 through the turbine shell 28 of the turbine wheel 22, as best shown in FIGS. 8 and 9.

In addition, the radially oriented first side plate 46 is formed with at least one, and preferably a plurality of second communication openings $55_2$ therethrough and circumferentially spaced from each other around the rotational axis X, as best shown in FIGS. 4A and 6. As further illustrated in FIGS. 4A and 6, the second communication openings $55_2$ are angularly spaced from the first communication openings $55_1$. Each of the second communication openings $55_2$ through the first side plate 46 is complementary to and registered with another one of the coupling openings 32 through the turbine shell 28 of the turbine wheel 22, i.e., the coupling openings 32 not receiving the coupling arms 47 therethrough, as best shown in FIGS. 8 and 9.

Thus, the first and second communication openings $55_1$ and $55_2$ through the first side plate 46 of the torque input member 40 of the torsional vibration damper 16 and the coupling openings 32 through the turbine shell 28 provide fluid communication between the torus and damper pressure chambers $23_1$ and $23_2$, respectively.

The first side plate 46 with the coupling arms 47 and the first and second communication openings 55₁ and 55₂ are formed by stamping from a steel blank.

In an assembled condition of the hydrokinetic torque-coupling device 10, one or more of the coupling arms 47 of the first side plate 46 drivingly engage the turbine shell 28 by axially extending through one or more of the coupling openings 32 in the turbine shell 28 of the turbine wheel 22, as best shown in FIGS. 3, 8 and 9. Accordingly, the turbine shell 28 of the turbine wheel 22 and the first side plate 46 of the torsional vibration damper 16 are non-rotatably coupled to one another. The turbine wheel 22 and the torque input member 40 of the torsional vibration damper 16 are thus non-rotatably coupled to one another. Moreover, each of the coupling arms 47 positively engages one of the coupling openings 32 so as to non-rotatably couple the turbine wheel 22 and the torque input member 40 of the torsional vibration damper 16, while allowing axial motion of the torsional vibration damper 16 with respect to the turbine wheel 22, as best shown in FIGS. 2 and 3. Accordingly, the torque input member 40 and the piston member 34 are non-rotatably coupled to and axially moveable relative to the turbine shell 28 of the turbine wheel 22.

According to the exemplary embodiment of the present invention, the first side plate 46 includes four (4) coupling arms with four (4) first communication openings 55₁, and four (4) second communication openings 55₂, while the turbine shell 28 of the turbine wheel 22 has eight (8) coupling openings 32. In other words, not each of the coupling openings 32 through the turbine shell 28 of the turbine wheel 22 receives one of the coupling arms 47 therethrough. The coupling openings 32 not engaged by the coupling arms 47 and the second communication openings 55₂ provide free hydraulic fluid flow through the first side plate 46 into a cavity axially between the first and second side plates 46 and 48 of the torsional vibration damper 16. Smaller amounts of the hydraulic fluid flows through the rest of the coupling openings 32 and the first communication openings 55₁.

The torque input member 40 further includes at least one, and preferably two supporting members 50. In the exemplary embodiment, the supporting members 50 are in the form of annular rolling bodies, such as cylindrical rollers rotatably mounted to the radially external peripheries of the first retainer plate 46 and the second side plates 48, and axially disposed between the first and second side plates 46 and 48, respectively. Each of the rolling bodies 50 is rotatable around a central axis C thereof best shown in FIGS. 2 and 3. The central axis C of the rolling body 50 is substantially parallel to the rotational axis X, as best shown in FIGS. 2 and 3.

The rolling bodies 50 are positioned so as to be diametrically opposite to one another, as best shown in FIG. 5. More specifically, the rolling bodies 50 are rotatably mounted about cylindrical shafts 52, which axially extend between the first and second side plates 46 and 48. The cylindrical shafts 52 have hollow interior and are mounted on the first and second side plates 46 and 48 through support pins 54 extending through the hollow interiors of the cylindrical shafts 52 and the first and second side plates 46 and 48, as best shown in FIGS. 3 and 4. The rolling bodies 50 are rotatably mounted on the cylindrical shafts 52 through rolling bearings, such as needle bearings 53, for instance, best shown in FIGS. 3 and 5.

The radially elastic output member 42 includes an annular output hub 44 coaxial with the rotational axis X and rotatable relative the torque input member 40, and at least one and preferably two substantially identical, radially opposite curved elastic leaves (or blades) 56 integral with the output hub 44, as best shown in FIG. 6. The radially elastic output member 42 is made of steel by fine stamping and necessary heat treatment.

The radially elastic output member 42 is configured to be elastically and radially supported by the rolling bodies 50 and to elastically bend in the radial direction upon rotation of the torque input member 40 with respect to the radially elastic output member 42, as best shown in FIGS. 3 and 5. A radially inner annular surface of the output hub 44 includes radially inner splines 45 for directly and non-rotatably engaging complementary radially outer splines 2c of the driven shaft 2. At the same time, the output hub 44 of the radially elastic output member 42 is axially moveable relative to the driven shaft 2 due to a splined connection therebetween. Accordingly, the radially elastic output member 42 is non-rotatably coupled to and axially moveable relative to the driven shaft 2.

As best shown in FIG. 6, each of the curved elastic leaves 56 is symmetrical with respect to the rotational axis X. Moreover, each of the curved elastic leaves 56 has a proximal end 58 non-moveably connected (i.e., fixed) to the output hub 44, a free distal end 60, a bent portion 62 adjacent to the proximal end 58, and a curved raceway portion 64 disposed adjacent to free distal end 60 of the elastic leaf 56 for bearing one of the rolling bodies 50. Also, the curved raceway portion 64 is connected to the output hub 44 by the bent portion 62. The output member 42 with the output hub 44 and the elastic leaves 56 is an integral (or unitary) component, e.g., made of a single part, but may be separate components fixedly connected together.

Each of the curved elastic leaves 56 and each of the raceway portions 64 are elastically deformable. The bent portion 62 subtends an angle of approximately 180°. A radially external surface of the curved raceway portion 64 of each of the curved elastic leaves 56 defines a radially outer raceway 66 configured as a surface that is in a rolling contact with one of the rollers 50, so that each of the rolling bodies 50 is positioned radially outside of the elastic leaf 56, as illustrated in FIGS. 2 and 3. The raceways 66 of the curved raceway portions 64 of the curved elastic leaf 56 extend on a circumference and subtend an angle ranging from about 90° to about 180°. The raceways 66 of each of the curved raceway portions 64 has a generally convex shape, as best shown in FIG. 6. Moreover, as the torque input member 40 is axially moveable along the rotational axis X relative to the turbine assembly 22 and the turbine assembly 22, the rolling bodies 50 are axially displaceable relative to the raceways 66 of the curved raceway portions 64 of the curved elastic leaves 56.

At least one of the first and second side plates 46 and 48 of the torsional vibration damper 16 is formed with at least one, and preferably a plurality of viewing windows 49 therethrough, as best shown in FIG. 6. In the exemplary embodiment of the present invention, the first side plate 46 of the torsional vibration damper 16 is formed with four (4) viewing windows 49 therethrough, which are circumferentially and equiangularly spaced from each other around the rotational axis X, as best shown in FIG. 6. As best shown in FIG. 4A, the viewing windows 49 are configured to expose a portion of the radially elastic output member 42 of the torsional vibration damper 16 therethrough, and to identify how the curved elastic blades 56 of the radially elastic output member 42 are angularly oriented, i.e., whether the curved elastic blades 56 extend in the circumferential direction clockwise or counterclockwise around the rotational axis X.

In operation, when a rolling body 50 moves along the raceway 66 of the curved raceway portion 64 of the curved elastic leaf 56, the rolling body 50 presses the curved raceway portion 64 of the curved elastic leaf 56 radially inwardly, thus maintaining contact of the rolling body 50 with the curved raceway portion 64 of the curved elastic leaf 56, as illustrated in FIG. 3. Radial forces make it possible for the curved elastic leaf 56 to bend, and forces tangential to a raceway 66 of a curved elastic leaf 56 make it possible for the rolling body 50 to move (roll) on the raceway 66 of the curved elastic leaf 56, and to transmit torque from the torque input member 40 to the output hub 44 of the elastic output member 42, and then to the driven shaft 2. Thus, the output hub 44 of the radially elastic output member 42, which is splined directly to the driven shaft 2, forms an output part of the torsional vibration damper 16 and a driven side of the torque-coupling device 10. The piston member 34, on the other hand, forms an input part of the torsional vibration damper 16. The torque from the driving shaft (or crankshaft) is transmitted to the casing 12 through the flexplate 11 and studs 13.

In the disengaged position of the lock-up clutch 15, the torque flows through the torque converter 14, i.e. the impeller wheel 20 and then the turbine wheel 22 non-rotatably coupled to the to the first side plate 46 of the torque input member 40. The torque is then transmitted to the driven shaft (transmission input shaft) 2 splined directly to the output hub 44.

In the engaged position of the lock-up clutch 15, torque from the casing 12 is transmitted to the torque input member 40 (i.e., the first and the second side plates 46 and 48, and the rolling bodies 50) through the elastic output member 42 formed by the output hub 44 and the elastic leaves 56. The torque is then transmitted from the output hub 44 of the elastic output member 42 to the driven shaft (transmission input shaft) 2 splined to the output hub 44. Moreover, when the torque transmitted between the casing 12 and the output hub 44 of the elastic output member 42 varies, the radial forces exerted between each of the elastic leaves 56 and the corresponding rolling body 50 vary and bending of the elastic leaves 56 is accordingly modified. The modification in the bending of the elastic leaf 56 comes with motion of the rolling body 50 along the corresponding raceway 66 of the curved elastic leaf 56 due to peripheral stresses.

The raceway 66 has a profile so arranged that, when the transmitted torque increases, the rolling body 50 exerts a bending force on the corresponding curved elastic leaf 56, which causes the free distal end 60 of the curved elastic leaf 56 to move radially towards the rotational axis X and produces a relative rotation between the torque input member 40 and the output hub 44 of the elastic output member 42, such that both the first and the second side plates 46, 48 and the output hub 44 move away from their relative rest positions. A rest position is that position of the torque input member 40 relative to the elastic output member 42, wherein no torque is transmitted between the casing 12 and the output hub 44 of the elastic output member 42 through the rolling bodies 50.

The profiles of the raceways 66 are such that the rolling bodies 50 exert bending forces (pressure) having radial and circumferential components onto the curved elastic leaves 56. Specifically, the elastic leaves 56 are configured so that in a relative angular position between the torque input member 40 and the elastic output member 42 different from the rest position, each of the rolling bodies 50 exerts a bending force on the corresponding elastic leaf 56, thus causing a reaction force of the elastic leaf 56 acting on the rolling body 50, with the reaction force having a radial component which tends to maintain the elastic leaf 56 in contact with the rolling body 50. In turn, each of the elastic leaves 56 exerts onto the corresponding rolling body 50 a back-moving force having a circumferential component which tends to rotate the rolling bodies 50 in a reverse direction of rotation, and thus to move the torque input member 40 (thus, the turbine wheel 22) and the output hub 44 of the elastic output member 42 back towards their relative rest positions, and a radial component directed radially outwardly, which tends to maintain each of the raceways 66 in direct contact with the corresponding rolling body 50. When the torque input member 40 and the elastic output member 42 are in the rest position, the elastic leaves 56 are preferably radially pre-stressed toward the rotational axis X so as to exert a reaction force directed radially outwards, to thus maintain the curved elastic leaves 56 supported by the associated rolling bodies 50.

Moreover, the profiles of the raceways 66 are so arranged that a characteristic transmission curve of the torque according to the angular displacement of the rolling body 50 relative to the raceway 66 is symmetrical or asymmetrical relative to the rest position as may be desired. According to the exemplary embodiment, the angular displacement of the rolling body 50 relative to the raceway 66 is more important in a direct direction of rotation than in a reverse (i.e., opposite to the direct) direction of rotation.

According to the exemplary embodiment, the angular displacement of the casing 12 relative to the elastic output member 42 in the locked position of the lock-up clutch 15 is greater than 20°, preferably greater than 40°. The curved elastic leaves 56 are regularly distributed around the rotational axis X and are symmetrical relative to the rotational axis X so as to ensure the balance of the torque converter 14.

The lock-up clutch 15 is provided for locking the driving shaft and the driven shaft 2 together. In other words, the lock-up clutch 15 is configured to non-rotatably couple the casing 12 and the torque input member 40 in the engaged (locked) position, and configured to drivingly disengage the casing 12 and the torque input member 40 in the disengaged (open) position.

The lock-up clutch 15 is usually activated after starting of the motor vehicle and after hydraulic coupling of the driving and driven shafts, in order to avoid the loss of efficiency caused in particular by slip phenomena between the turbine wheel 22 and the impeller wheel 20. The piston member 34 is axially displaceable toward (an engaged (or locked) position of the lock-up clutch 15) and away (a disengaged (or open) position of the lock-up clutch 15) from the locking surface 18 inside the casing 12. Moreover, the piston member 34 is axially displaceable away from and toward the locking surface 18 of the casing 12 together with the torsional vibration damper 16 relative to the driven shaft 2 along the rotational axis X. The sealing member (e.g., the sealing ring) 72 creates a seal at the interface of the cylindrical flange 48$if$ of the second side plate 48 and the driven shaft 2.

The axial motion of the piston member 34 and the torsional vibration damper 16 along the driven shaft 2 is controlled by a pressure differential between the torus and damper pressure chambers $23_1$ and $23_2$ positioned on axially opposite sides of the torsional vibration damper 16.

The piston member 34 is selectively pressed against the locking surface 18 of the casing 12 so as to lock-up the torque-coupling device 10 between the driving shaft and the driven shaft 2 to control sliding movement between the turbine wheel 22 and the impeller wheel 20. As discussed above, the torque input member 40 of the torsional vibration damper 16 with the piston member 34 is axially movable toward and away from the locking surface 18 of the casing 12 between the lockup position and the non-lockup (open) position. Axial movement of the torque input member 40 is accomplished by changing the pressure differential between the torus and damper pressure chambers $23_1$ and $23_2$. A pressure increase in the torus chamber $23_1$ relative to the damper chamber $23_2$ (or stated differently, a pressure decrease in the damper chamber $23_2$ relative to the torus chamber $23_1$) shifts the torsional vibration damper 16 and the piston member 34 axially in the direction of torque transmission, i.e., towards the locking surface 18 of the casing 12, that is left to right in FIG. 2, into the lockup position.

Specifically, when the pressure in the torus chamber $23_1$ increases relative to the damper chamber $23_2$, the hydraulic fluid from the torus chamber $23_1$ flows under pressure into the cavity between the first and second side plates 46 and 48 of the torsional vibration damper 16 through the coupling openings 32 in the turbine shell 28 of the turbine wheel 22 and the first and second communication openings $55_1$ and $55_2$ in the first side plate 46. As a result, the hydraulic fluid from the torus chamber $23_1$ presses the second side plate 48 in the direction away from the turbine wheel 22 so as to displace the torsional vibration damper 16 with the piston member 34 towards the locking surface 18 of the casing 12. In other words, when an appropriate hydraulic pressure in applied to the torque input member 40 of the torsional vibration damper 16, the torsional vibration damper 16 with the piston member 34 moves rightward (as shown in FIG. 2) toward the locking surface 18 of the casing 12 and away from the turbine wheel 22, and clamps (engages) the friction liner 35 between itself and the locking surface 18 of the casing 12. As a result, the lock-up clutch 15 in the locked position is mechanically frictionally coupled to the casing 12 so as to bypass the turbine wheel 22 when in the locked position of the lock-up clutch 15. Thus, the lock-up clutch 15 is provided to bypass the turbine wheel 22 when in the locked position thereof.

On the other hand, a pressure increase in the damper chamber $23_2$ relative to the torus chamber $23_1$ (or stated differently a pressure decrease in the torus chamber $23_1$ relative to the damper chamber $23_2$) shifts the torsional vibration damper 16 and the piston 34 affixed thereto axially against the direction of torque transmission, i.e., away from the locking surface 18 of the casing 12, that is right to left in FIG. 2, out of the lockup position. Pressure changes are created by control of the fluid, e.g., hydraulic fluid or oil, in the chambers $23_1$ and $23_2$. Specifically, when the pressure in the damper chamber $23_2$ increases relative to the torus chamber $23_1$, the hydraulic fluid in the damper chamber $23_2$ presses the second side plate 48 in the direction toward the turbine wheel 22 so as to displace the torsional vibration damper 16 with the piston member 34 away from the locking surface 18 of the casing 12. In other words, when an appropriate hydraulic pressure in applied to the torque input member 40 of the torsional vibration damper 16, the torsional vibration damper 16 with the piston member 34 moves leftward (as shown in FIG. 2) toward the turbine wheel 22 and away from the locking surface 18 of the casing 12, and disengages the friction liner 35 from the locking surface 18 of the casing 12. As a result, the lock-up clutch 15 in the disengaged position mechanically frictionally uncouples the torsional vibration damper 16 from the casing 12 so that the turbine wheel 22 is hydro-dynamically rotationally drivable by the impeller wheel 20. Thus, in the non-lockup mode, torque is transferred from the engine to the casing 12, then from the impeller wheel 20 hydrodynamically to the turbine wheel 22, then the torsional vibration damper 16, and from the output hub 44 of the torsional vibration damper 16 directly to the driven shaft 2.

During operation, when the lock-up clutch 15 is in the disengaged (open) position, the engine torque is transmitted from the impeller wheel 20 by the turbine wheel 22 of the torque converter 14 to the driven shaft 2 through the torsional vibration damper 16. When the lock-up clutch 15 is in the engaged (locked) position, the engine torque is transmitted by the casing 12 to the driven shaft 2 also through the torsional vibration damper 16.

A method for assembling the hydrokinetic torque-coupling device 10 is as follows. It should be understood that this exemplary method may be practiced in connection with the other embodiments described herein. This exemplary method is not the exclusive method for assembling the turbine assembly described herein. While the methods for assembling the hydrokinetic torque-coupling device 10 may be practiced by sequentially performing the steps as set forth below, it should be understood that the methods may involve performing the steps in different sequences.

The method for assembling the hydrokinetic torque-coupling device 10 is as follows. First, the impeller wheel 20, the turbine wheel 22, the stator 24, and the torsional vibration damper 16 may each be preassembled. The impeller wheel 20 and the turbine wheel 22 are formed by stamping from steel blanks or by injection molding of a polymeric material. The turbine shell 28 of the turbine wheel 22 is formed with at least one, preferably a plurality of coupling openings 32 therethrough and circumferentially spaced from each other. The stator 24 is made by casting from aluminum or injection molding of a polymeric material. The impeller wheel 20, the turbine wheel 22 and the stator 24 subassemblies are assembled together so as to form the torque converter 14.

The torsional vibration damper 16 is then added. The first side plate 46 with the coupling arms 47 and the first and second communication openings $55_1$ and $55_2$ is formed by stamping from a steel blank. The second side plate 48 is also formed by stamping from a steel blank. Before the torsional vibration damper 16 is assembled, the piston member 34 of the lock-up clutch 15 is fixed (i.e., non-movably secured) to the first side plate 46 of the torque input member 40 by appropriate means, such as by welding, adhesive bonding or fasteners, such as rivets. Next, the torsional vibration damper 16 is mounted to the turbine wheel 22 so that the turbine shell 28 non-rotatably engages the first side plate 46 of the torque input member 40 of the torsional vibration damper 16. Specifically, the coupling arms 47 of the first side plate 46 engage the coupling openings 32 of the turbine shell 28.

Then, the first shell $17_1$ is non-moveably and sealingly secured, such as by welding at 19, to the second casing shell $17_2$, as best shown in FIG. 2. After that, the torque-coupling device 10 is mounted to the driven shaft 2 (i.e., the input shaft of the automatic transmission of the motor vehicle) so that the output hub 44 of the elastic output member 42 of the torsional vibration damper 16 is splined directly to the transmission input shaft 2 and the cylindrical flanges 46*if* and 48*if* of torque input member 40 of the torsional vibration damper 16 are slidably mounted over the transmission input shaft 2. Various modifications, changes, and alterations may be practiced with the above-described embodiment.

Therefore, the hydrokinetic torque-coupling device of the present invention provides a number of advantages over the conventional hydrokinetic torque-coupling devices. Specifically, the hydrokinetic torque-coupling device of the present invention simplifies the design, makes assembly of the hydrokinetic torque-coupling device easier, and saves both weight and manufacturing cost of the hydrokinetic torque-coupling device.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for coupling a driving shaft and a driven shaft together, comprising:
    a casing rotatable about a rotational axis and having a locking surface;
    a torque converter including an impeller wheel rotatable about the rotational axis and a turbine wheel disposed in the casing coaxially with the rotational axis, the turbine wheel disposed axially opposite to the impeller wheel and hydro-dynamically rotationally drivable by the impeller wheel; and
    a locking piston axially moveable along the rotational axis to and from the locking surface of the casing, the locking piston having an engagement surface configured to selectively frictionally engage the locking surface of the casing to position the hydrokinetic torque-coupling device into and out of a lockup mode in which the locking piston is mechanically frictionally locked to the casing so as to be non-rotatable relative to the casing;
    the locking piston including a torsional vibration damper comprising
        a torque input member including a radially oriented first side plate and at least one supporting member mounted thereto; and
        a unitary radially elastic output member pivotable relative to and elastically coupled to the torque input member;
        the radially elastic output member including an annular output hub coaxial with the rotational axis and rotatable relative the torque input member, and at least one elastic blade integral with the output hub and configured to elastically and radially engage the at least one supporting member and to elastically bend in the radial direction upon rotation of the first side plate with respect to the radially elastic output member;
        the at least one elastic blade having a proximal end non-moveably connected to the output hub, a free distal end and a curved raceway portion disposed between the proximal and free distal ends of the at least one elastic blade for bearing the at least one supporting member;
    the annular output hub of the radially elastic output member being adapted to directly and non-rotatably engage the driven shaft;
    the first side plate of the torque input member of the torsional vibration damper non-rotatably engaging the turbine wheel;
    the torque input member axially moveable relative to both the impeller wheel and turbine wheel to and from the locking surface of the casing.

2. The hydrokinetic torque-coupling device as defined in claim 1, wherein the annular output hub of the radially elastic output member is rotatable relative to the turbine wheel.

3. The hydrokinetic torque-coupling device as defined in claim 1, wherein the locking piston further includes a piston member having the engagement surface, and wherein the piston member is non-moveably connected to the torque input member of the torsional vibration damper.

4. The hydrokinetic torque-coupling device as defined in claim 1, wherein an annular inner peripheral surface of the output hub has a plurality of splines configured to directly and non-rotatably engage the driven shaft.

5. The hydrokinetic torque-coupling device as defined in claim 1, wherein the impeller wheel includes an impeller shell and the turbine wheel includes a turbine shell disposed axially opposite the impeller shell, wherein the casing includes the impeller shell and a casing shell non-moveably connected to the impeller shell to establish the casing, and wherein one of the casing shell and the impeller shell has the locking surface.

6. The hydrokinetic torque-coupling device as defined in claim 1, wherein the at least one supporting member includes at least one support pin extending axially from the first retainer plate and at least one annular rolling body coaxially mounted on the at least one support pin for rotation around a central axis thereof.

7. The hydrokinetic torque-coupling device as defined in claim 3, wherein the torque input member further includes a radially oriented second side plate, which is axially spaced from and non-moveably attached to the first side plate.

8. The hydrokinetic torque-coupling device as defined in claim 7, wherein the piston member is non-moveably connected to the second side plate of the torque input member of the torsional vibration damper.

9. The hydrokinetic torque-coupling device as defined in claim 5, wherein the turbine shell of the turbine wheel is formed with at least one coupling opening therethrough, and wherein the first side plate includes at least one coupling arm axially extending therefrom and drivingly engaging the turbine shell by axially extending through the at least one coupling opening in the turbine shell of the turbine wheel.

10. The hydrokinetic torque-coupling device as defined in claim 9, wherein the at least one coupling arm is unitary with the first side plate.

11. The hydrokinetic torque-coupling device as defined in claim 5, wherein the turbine shell of the turbine wheel is formed with a plurality of coupling openings therethrough, and wherein the first side plate includes a plurality of coupling arms axially extending therefrom and drivingly engaging the turbine shell by axially extending through the plurality of coupling openings in the turbine shell of the turbine wheel.

12. The hydrokinetic torque-coupling device as defined in claim 11, wherein each of the coupling arms is unitary with the first side plate.

13. The hydrokinetic torque-coupling device as defined in claim 11, wherein the first side plate further includes a plurality of first communication openings each adjacent to one of the coupling arms, and wherein each of the first communication openings is registered with one of the coupling openings through the turbine shell of the turbine wheel.

14. The hydrokinetic torque-coupling device as defined in claim 13, wherein the first side plate further includes a plurality of second communication openings angularly spaced from the first communication openings, and wherein each of the second communication openings is registered with one of the coupling openings through the turbine shell of the turbine wheel not receiving the coupling arm.

15. The hydrokinetic torque-coupling device as defined in claim 1, wherein the first side plate of the torque input member of the torsional vibration damper has at least one viewing window therethrough configured to expose a portion of the radially elastic output member of the torsional vibration damper therethrough and to identify angular orientation of the elastic blades of the radially elastic output member around the rotational axis.

16. A method for assembling a hydrokinetic torque-coupling device for coupling a driving shaft and a driven shaft together, the method comprising the steps of:
providing a casing having a locking surface;
providing a torque converter comprising an impeller wheel and a turbine wheel; and
providing a locking piston having an engagement surface configured to selectively frictionally engage the locking surface of the casing to position the hydrokinetic torque-coupling device into and out of a lockup mode in which the locking piston is mechanically frictionally locked to the casing so as to be non-rotatable relative to the casing;
the locking piston including a torsional vibration damper comprising
a torque input member including a radially oriented first retainer plate and at least one supporting member mounted thereto; and
a unitary radially elastic output member rotatable relative to and elastically coupled to the torque input member;
the radially elastic output member including an annular output hub coaxial with the rotational axis and rotatable relative the torque input member, and at least one elastic blade integral with the output hub and configured to elastically and radially engage the at least one supporting member and to elastically bend in the radial direction upon rotation of the first retainer plate with respect to the radially elastic output member;
the at least one elastic blade having a proximal end non-moveably connected to the output hub, a free distal end and a curved raceway portion disposed between the proximal and free distal ends of the at least one elastic blade for bearing the at least one supporting member;
the annular output hub of the radially elastic output member being adapted for directly and non-rotatably engaging the driven shaft; and
non-rotatably connecting the first side plate of the torsional vibration damper to the turbine wheel so that the engagement surface of the locking piston facing the locking surface of the casing.

17. The method as defined in claim 16, wherein the impeller wheel includes an impeller shell and the turbine wheel includes a turbine shell disposed axially opposite the impeller shell, wherein the casing includes the impeller shell and a casing shell, and wherein one of the casing shell and the impeller shell has the locking surface.

18. The method as defined in claim 17, further including the step of non-moveably securing the impeller shell to the casing shell.

19. The method as defined in claim 18, further including the step of mounting the hydrokinetic torque-coupling device to the driven shaft so that the output hub of the elastic output member of the torsional vibration damper is non-rotatably coupled to the driven shaft.

20. The method as defined in claim 19, wherein an annular inner peripheral surface of the output hub has a plurality of radially inner splines configured to directly engage complementary radially outer splines of the driven shaft.

* * * * *